United States Patent
Hoghoj et al.

(10) Patent No.: US 11,796,485 B2
(45) Date of Patent: Oct. 24, 2023

(54) X-RAY SCATTERING APPARATUS

(71) Applicant: XENOCS SAS, Grenoble (FR)

(72) Inventors: Peter Hoghoj, Grenoble (FR); Blandine Lantz, Grenoble (FR)

(73) Assignee: XENOCS SAS, Grenoble (FR)

( * ) Notice: Subject to any disclaimer, the term of this patent is extended or adjusted under 35 U.S.C. 154(b) by 43 days.

(21) Appl. No.: 17/621,005

(22) PCT Filed: Dec. 29, 2020

(86) PCT No.: PCT/EP2020/087969
§ 371 (c)(1),
(2) Date: Dec. 20, 2021

(87) PCT Pub. No.: WO2021/136774
PCT Pub. Date: Jul. 8, 2021

(65) Prior Publication Data
US 2022/0326166 A1  Oct. 13, 2022

(30) Foreign Application Priority Data

Dec. 30, 2019 (EP) .................................. 19290126
Sep. 21, 2020 (EP) .................................. 20197189

(51) Int. Cl.
*G01N 23/201* (2018.01)
*G01N 23/041* (2018.01)
*G01N 23/207* (2018.01)

(52) U.S. Cl.
CPC ......... *G01N 23/041* (2018.02); *G01N 23/201* (2013.01); *G01N 23/207* (2013.01); *G01N 2223/054* (2013.01); *G21K 2201/067* (2013.01)

(58) Field of Classification Search
CPC .... G01N 23/041; G01N 23/201; G01N 23/27; G01N 2223/054; G01N 2201/067; G01N 23/2008; G01N 23/20083; G21K 1/06
See application file for complete search history.

(56) References Cited

U.S. PATENT DOCUMENTS

| | | | |
|---|---|---|---|
| 5,245,648 | A | 9/1993 | Kinney |
| 7,035,373 | B2 | 4/2006 | Omote |

(Continued)

FOREIGN PATENT DOCUMENTS

| | | | |
|---|---|---|---|
| EP | 1462795 A2 | 9/2004 | |
| EP | 3190593 A2 | 7/2017 | |

(Continued)

OTHER PUBLICATIONS

International Search Report and Written Opinion for corresponding PCT application No. PCT/EP2020/087969, dated Apr. 7, 2021.

*Primary Examiner* — David P Porta
*Assistant Examiner* — Mamadou Faye
(74) *Attorney, Agent, or Firm* — Notaro, Michalos & Zaccaria P.C.

(57) ABSTRACT

An X-ray scattering apparatus having a sample holder for aligning and/or orienting a sample to be analyzed by X-ray scattering, a first X-ray beam delivery system having a first X-ray source and a first monochromator being arranged upstream of the sample holder for generating and directing a first X-ray beam along a beam path, a distal X-ray detector arranged downstream of the sample holder and being movable, in a motorized way, is disclosed. The first X-ray beam delivery system is configured to focus the first X-ray beam onto a focal spot near the distal X-ray detector when placed at its largest distance from the sample holder or produce a parallel beam so that the X-ray scattering apparatus has a second X-ray beam delivery system having a second X-ray (Continued)

source and being configured to generate and direct a divergent second X-ray beam towards the sample holder for X-ray imaging.

22 Claims, 6 Drawing Sheets

(56) References Cited

U.S. PATENT DOCUMENTS

| | | |
|---|---|---|
| 2006/0062351 A1 | 3/2006 | Yokhin |
| 2015/0051877 A1 | 2/2015 | Bakeman |
| 2017/0131224 A1 | 5/2017 | Paulus |
| 2019/0170669 A1 | 6/2019 | Hoghoj |
| 2019/0313991 A1 * | 10/2019 | Proksa ................ A61B 6/482 |
| 2019/0348257 A1 | 11/2019 | Hunt |

FOREIGN PATENT DOCUMENTS

| | | | |
|---|---|---|---|
| EP | 3246695 A1 | 11/2017 | |
| JP | H07301700 A | 11/1995 | |
| WO | 2006075296 A1 | 7/2006 | |
| WO | WO-2016092300 A1 * | 6/2016 | ............ G01N 23/04 |

* cited by examiner

X-RAY SCATTERING APPARATUS

The present invention relates to an X-ray scattering apparatus.

Typically X-ray scattering and X-ray diffraction instruments include
1) a source
2) a wavelength selector (monochromator)
3) a collimation section (defining the beam direction and removing residual background scattering or divergence)
4) a sample area
5) and a detector area.

In the years since X-ray analysis was employed there has been a tremendous development of the individual components driven by the need for faster measurements and better data quality, in turn providing characterization answers for a larger and larger group of structured and quasi-structured samples.

In addition, various highly specialized diffraction and scattering geometries have been developed to extract more particular information, for example
1) X-ray Powder Diffraction
   a. Bragg-Brentano Reflection
   b. Guinier Transmission
2) Single Crystal Diffraction (Transmission)
3) Back-Reflection Laue
4) Grazing Incidence X-ray Diffraction
5) X-Ray reflectivity
6) Texture
7) Small Angle X-ray Scattering (Transmission)
8) Wide Angle X-Ray Scattering (Transmission)
9) Bonse-Hart Ultra Smart Angle Scattering In order to make the most of the instrument investment, several X-ray scattering apparatus allow an easy switch between the different configurations. As an example, switching wavelengths by changing source anode material, e.g. the Xenocs Dual-Source SAXS, or switching techniques by changing collimation components can be mentioned. So with only a small additional cost one can reoptimize the instrument for a completely new scattering or diffraction application.

Material science and development requires structure characterization over large length scales to study the hierarchical structure impact on material function. Complex materials would exhibit more or less structured entities depending on the length scale. Moreover the development of new materials would require in-situ characterization depending on external parameters, or in-operation structural characterization. Nano-structured materials with a structure typically in the length scale of 1 to 150 nm can be characterized with Small Angle X-ray Scattering (SAXS) at scattering angles ranging typically from 0.05° to 10° when two phases with sufficient electron density contrast are present by analyzing the intensity of the X-ray beam elastically scattered by the sample. The technique has been widely used for soft matter characterization, e.g. in the field of polymers, colloids or proteins in solutions.

New materials characterization requires combination with Wide Angle X-ray Scattering (WAXS) to characterize crystalline structure, and most SAXS characterization instruments combine SAXS/WAXS and USAXS (Ultra-Small Angle X-ray Scattering) to probe structures from typically 1 Å to few microns, e.g. using a USAXS Bonse-Hart configuration to measure scattering profiles in 1 direction only.

In other words, while Wide Angle X-ray Scattering (WAXS) typically gives access to information on crystallinity and crystalline phase(s) of a sample to be analyzed, Small Angle X-ray Scattering (SAXS) typically gives access to information about the sample structure on the nano-scale level (nano-structure). As both crystalline phase and nano-structure influence material properties, there is an interest in performing both SAXS and WAXS on the same sample and on the same instrument.

However, while most of the X-ray techniques of interest mentioned above can optimally be configured in fairly compact instrumentation suitable for tabletop applications or at most smaller laboratory instrumentation of a footprint less than 2 m by 2 m, that is not the case for SAXS instrumentation, where long instruments (3 m to 10 m) consistently provide a better combination of resolution and intensity. Shorter instruments provide less intensity at the highest resolution desired in SAXS and consequently instrumentation stays long.

Nevertheless, recent developments have begun to couple traditional SAXS with other configurations such as Bonse-Hart Ultra-Small-Angle X-ray Scattering, Grazing Incidence Diffraction, Wide Angle X-ray Scattering, as well as Powder and Texture analysis.

In order to carry out SAXS and WAXS measurements on the same sample and instrument, an X-ray scattering apparatus, comprising:
a sample holder for aligning and/or orienting a sample to be analyzed by X-ray scattering;
a first X-ray beam delivery system comprising a first X-ray source and a first monochromator and being arranged upstream of the sample holder for generating and directing a first X-ray beam along a beam path in a propagation direction towards the sample holder;
a distal X-ray detector arranged downstream of the sample holder and being movable, in particular in a motorized way, along the propagation direction such as to detect the first X-ray beam and X-rays scattered at different scattering angles from the sample;
wherein the first X-ray beam delivery system is configured to focus the first X-ray beam onto a focal spot on or near the distal X-ray detector when placed at its largest distance from the sample holder or to produce a parallel beam,
is commercially available from the applicant under the name "Xeuss 3.0".

The first X-ray beam delivery system of this conventional X-ray scattering apparatus comprises a first X-ray source, for example a source with Cu or Mo anode for generating X-rays, and an optics and collimation system including a first monochromator for directing and conditioning the generated first X-ray beam along the essentially horizontal propagation direction towards the sample holder which may comprise a motorized translation and/or rotation stage and other typical sample stage devices known in the field of X-ray scattering and may be positioned in a vacuum chamber.

This conventional X-ray scattering apparatus comprises at least one X-ray detector which is arranged downstream of the sample holder, i.e. on a side of the sample holder opposite to the side of the first X-ray beam delivery system:

A distal X-ray detector is normally mounted on a detector stage which allows for translation along the propagation direction of the direct beam over large horizontal distances from the sample holder, typically in a range between 50 mm and 1000 mm or larger, e.g. up to 5000 mm. Depending on the positional details of the distal X-ray detector and the size of its sensor, it is typically able to detect X-rays scattered from the sample at scattering angles with respect to the direct X-ray beam as small as approximately 2θ=0.05° and as large as 60° to 70°. The distal X-ray detector is thus suitable for Small Angle X-ray Scattering (SAXS) providing information on the sample structure at the nano-scale level and Wide Angle X-ray Scattering (WAXS) providing information on sample crystallinity.

Scientists developing new types of materials like e.g. plastics, elastomers, composites, foams, textiles, biopolymers are used to combining X-ray scattering measurements with X-ray imaging, in particular X-ray radiography based on absorption or phase contrast which is particularly advantageous for light element materials (or materials with low Z). Some example of applications combining these techniques are the characterization of semi-crystalline polymers, polymers fibers or nanocomposites where structural information and its orientation at the atomic scale and nanoscale could be coupled with X-ray imaging information to optimize mechanical performance or other materials property. For polymeric materials, example of parameters of relevance are the crystallinity and crystallites orientation determined with WAXS, the nanometer scale domain sizes and their orientation determined with SAXS, while voids and cracks in the material could be measured with X-ray radiography. Studying how these parameters correlate could be of high relevance for developing new materials. Consequently, two different instruments or even more, if all the techniques are combined, have to be used which limits the systematic access to the combined methodology of analysis.

More-over cross comparison of measurements could be tricky and require time to set up all the experiments since the field of view is different for imaging on the one hand and SAXS/WAXS characterizations on the other hand (this may require cutting a sample or pre-localisation of an analysis area for further x-ray scattering experiment). One advantage of the invention will be to combine both measuring techniques X-ray scattering (SAXS and WAXS) and X-ray imaging (absorption and/or phase contrast radiography) on a same set-up to be able to analyze systematically a same sample with both techniques. The set-up could be for example advantageously used for in-situ dynamic experiments where sample is exposed to temperature, stress, shear, humidity or other type of external solicitation by providing information at wider lengths scales through sequential use of X-ray scattering and X-ray imaging measuring channel during the in-situ dynamic experiment.

More over another advantage will be to improve X-ray scattering analysis of large samples having a size of a few millimeters with inhomogeneous properties which could require a previous mapping of the sample to be done since typical X-ray footprints on SAXS/WAXS instruments are usually in the range of less than a mm2. This task is generally accomplished by performing a X-ray transmission map (or absorption map) of the sample measuring the transmitted intensity of the direct X-ray beam through the sample in order to define a Region of Interest for further SAXS or WAXS characterization. Such absorption mapping contrast requires very long measurement times with an X-ray scattering analysis set-up as the X-ray beam delivery system provides a monochromatic beam with controlled divergence and beamsize on sample required for SAXS. One of the further advantage of the invention is to propose an improved X-ray scattering apparatus with optimum conditions for SAXS/WAXS experiments on large inhomogeneous samples (inhomogeneities at few hundred microns to millimeters scales).

It is therefore an object of the invention to propose an improved X-ray scattering apparatus of the above type that allows to provide optimum conditions for SAXS and X-ray imaging measurements, respectively.

According to the invention this object is achieved by an X-ray scattering apparatus of the above conventional type, which is characterized in that the X-ray scattering apparatus furthermore comprises a second X-ray beam delivery system comprising a second X-ray source and being configured to generate and direct a divergent second X-ray beam towards the sample holder for X-ray imaging.

Since the second X-ray beam delivery system for imaging is provided as part of the same X-ray scattering apparatus it is no longer necessary to move the sample between different instruments. Furthermore the second X-ray source generates and directs a divergent second X-ray beam towards the sample holder which has beam characteristics optimized for X-ray imaging. It is therefore not necessary to use the first X-ray beam which is usually optimized for SAXS or WAXS measurements also for imaging purposes thus saving pretious measurement time. The X-ray scattering apparatus according to the invention in particular allows to perform an X-ray imaging analysis of a sample mounted on the sample holder using the second X-ray beam, then to define a region of interest in or on the sample based on the results of said X-ray imaging analysis, and consecutively to perform an X-ray scattering analysis of said region of interest using said first X-ray beam, e.g. by SAXS and/or WAXS measurements.

In one embodiment of the X-ray scattering apparatus according to the invention, the second X-ray beam has a propagation direction having an angle with respect to the propagation direction of the first X-ray beam of less than or equal to 10°. In particular the second X-ray beam may be parallel to the first X-ray beam. Since both X-ray beams then propagate parallel or almost parallel, it is possible to use the distal X-ray detector not only for the SAXS/WAXS measurements in the usual way, but also for the X-ray imaging measurements. For this purpose, the distal X-ray detector can be movable not only along the propagation direction of the first X-ray beam but also in a plane perpendicular thereto.

In one of the embodiments of the invention, the second X-ray beam delivery system can be fixedly located at a position upstream of the sample holder such as to let the first X-ray beam pass. This allows both X-ray beams to reach the sample environment, e.g. a vacuum chamber in which the sample holder is located. If the sample is large enough, and the source is very compact, it can in principle be reached by both beams without having to be moved.

However, in these embodiments of an X-ray scattering apparatus according to the invention with parallel or almost parallel X-ray beams, it is preferred that the sample holder is movable, in particular in a motorized way, in a plane perpendicular to the propagation direction of the first X-ray beam. This allows to move the sample from a first measurement position in which it intercepts the first X-ray beam for SAXS and/or WAXS measurements to a second measurement position in which it intercepts the second X-ray beam for imaging measurements, and vice versa.

Instead of having the second X-ray beam delivery system fixedly located at a position upstream of the sample holder such as to let the first X-ray beam pass, the X-ray scattering apparatus according to the invention may furthermore comprise an insertion module configured to move the second X-ray beam delivery system into the first X-ray beam at a position upstream of the sample holder. The insertion module may allow for a computer controlled movement of the second X-ray beam delivery system avoiding any manual interaction by a user.

In this case the X-ray scattering apparatus preferably furthermore comprises a main collimation tube extending along the beam path from a position downstream the first X-ray beam delivery system to a position upstream the sample holder, wherein the insertion module comprises a motorized platform configured to alternatively position the second X-ray beam delivery system or a collimation tube extension into the beam path at a position between the main collimation tube and the sample holder. For SAXS measurements the collimation tube extension is then positioned in the beam path allowing the first X-ray beam to serve as the direct beam that impinges onto the sample mounted on the sample holder. For imaging measurements, however, the second X-ray beam delivery system is positioned in the beam path by means of the motorized platform. The computer control system of the X-ray scattering apparatus can then activate a shutter of the first X-ray beam delivery system to block the first X-ray beam while activating a shutter of the second X-ray beam delivery system so that the second X-ray beam irradiates the sample mounted on the sample holder.

Preferably the downstream end of the main collimation tube and the upstream end of the collimation tube extension are provided with respective connection elements for vacuum-tight connection. This allows to essentially keep the beam path in vacuum all the way from the first X-ray beam delivery system to the sample holder when the collimation tube extension is positioned in the beam path during SAXS measurements.

Instead of using parallel or almost parallel first and second X-ray beams in order to use the distal X-ray detector for SAXS/WAXS and for imaging measurements, other embodiments of the X-ray scattering apparatus according to the invention can be characterized in that the second X-ray beam has a propagation direction having an angle with respect to the propagation direction of the first X-ray beam of greater than 10°. In these embodiments the second X-ray beam delivery system is preferably located at a position upstream of the sample holder such as to let the first X-ray beam pass, furthermore comprising a proximal X-ray detector arranged downstream of the sample holder such as to let the first X-ray beam pass and detect X rays from the second X-ray beam delivery system transmitted through the sample. This proximal X-ray detector may not only be used for imaging measurements according to the invention but also for WAXS measurements as is described in detail in the applicant's European Patent Application 19290126.2 the contents of which are herewith incorporated by reference.

In a preferred further development of this embodiment the sample holder and/or the proximal X-ray detector may be rotatable, in particular in a motorized way, about at least one axis of rotation passing through the sample holder and being perpendicular to the propagation direction of the second X-ray beam. This allows to rotate the sample from a first measurement position in which it intercepts the first X-ray beam for SAXS and/or WAXS measurements to a second measurement position in which it intercepts the second X-ray beam for imaging measurements, and vice versa, with the sample surface being essentially perpendicular to the respective X-ray beam in both measurement positions.

Preferably the X-ray scattering apparatus according to the invention furthermore comprises an object insertion unit adapted to insert a random structured object into the second X-ray beam upstream or downstream of the sample holder. This allows to carry out special kinds of X-ray phase contrast imaging analysis based on a measurement of the refraction angle, a phase contrast map being obtained by comparing a pattern generated by the random structured object with and without sample interaction when it is placed into the beam. Speckle-based phase contrast imaging is one of these methods described in detail below in connection with the method according to the invention.

Alternatively the X-ray scattering apparatus according to the invention comprises an object insertion unit adapted to insert into the second X-ray beam a structured object with a repeating structure adapted to produce a wavefront modulation of the second X-ray beam in order to obtain a phase map of the sample by comparing the image generated by the structured object with and without sample interaction when it is placed into the beam.

Preferably the X-ray scattering apparatus according to the invention furthermore comprises a mask insertion unit adapted to insert a diffractive mask into the second X-ray beam upstream or downstream of the sample holder, said diffractive mask being adapted to produce a modulation pattern of the X-ray beam in order to produce a 2D dark-field image of the sample by comparing the pattern generated by the diffractive mask with and without sample interaction when it is placed into the beam.

In all embodiments and further developments the X-ray scattering apparatus according to the invention preferably furthermore comprises a computer control system configured to control the X-ray scattering apparatus such as to carry out measurements using the first X-ray beam delivery system and the second X-ray beam delivery system one after the other or simultaneously.

The invention furthermore refers to an X-ray scattering method using an X-ray scattering apparatus as described above and preferably comprising the following steps:
performing an X-ray imaging analysis of a sample mounted on the sample holder using said second X-ray beam;
defining a region of interest in or on the sample based on the results of said X-ray imaging analysis; and
performing an X-ray scattering analysis of said region of interest using said first X-ray beam.

The X-ray imaging analysis of the sample may comprise a plurality of imaging methods that will be described in the following:

Phase Contrast Imaging

The X-ray scattering apparatus according to the invention described allows to perform a method according to the invention obtaining an X-ray image based on sample absorption contrast with a resolution of few microns to tens of microns. In a preferred embodiment of the invention the X-ray imaging part of the apparatus is also adapted for phase contrast imaging in order to perform X-ray imaging on samples with low absorption contrast. X-ray imaging is based on contrast from X-rays that get attenuated when passing through a medium. Attenuation and Phase contrast are essentially determined by respectively $\beta$ and $\delta$ which are the imaginary and real part of the complex refractive index n of the material ($n=1-\delta+i\beta$). In the hard X-ray regime (for high energies) low-Z materials have much larger $\delta$ than $\beta$. Phase contrast imaging is much more sensitive than absorption-contrast imaging for light materials and in particular when using higher energies (>10 keV).

As the apparatus of the invention is a combined X-ray scattering and X-ray imaging system, materials to be used are generally low Z-materials that do not require an X-ray source for imaging with high energy. Still the phase contrast imaging channel could be highly advantageous for edge enhancement or imaging features with close absorption contrast to the matrix.

Different X-ray phase contrast imaging methods could be used. Some are based on measuring the refractive angle caused by the phase contrast, others on interferometry methods.

Propagation Based Phase Contrast Imaging

In an embodiment of the invention phase contrast imaging is achieved using the second beam delivery system without any additional component by analyzing free propagation of an X-ray wave front and studying the impact of the sample on such wave front. By using increased propagation distance (i.e. increased distance between the object and the detector) the imaging goes from the absorption-contrast image, to the near-field imaging regime where phase changes develop into intensity variations that can be detected. Phase contrast imaging with propagation method (PBI) requires an X-ray source with a high spatial coherence. PBI method will be used with an X-ray imaging source of a spot size smaller than 50 microns, preferably smaller than 10 microns and an X-ray imaging source producing a main energy (fluorescence line of the anode comprised in between 8 and 30 keV) so that the propagation distance remains in the near field.

As the phase contrast gets more pronounced with longer effective propagation distance, use of the PBI phase contrast imaging channel according to the invention could include measuring an X-ray image of a sample using absorption contrast with a large field of view on sample using a small S1' object to detector distance, determining a potential zone of interest (i.e a zone where specific features are guessed or expected) and based on this image, measuring a second image at a longer distance S1' for better feature enhancement using phase contrast imaging. Phase contrast imaging for example could be used to define a weld zone in case bonding materials have equivalent absorption contrast to define the appropriate positioning of the small angle X-ray scattering measuring position.

In another embodiment of a method according to the invention, an X-ray scattering analysis of the sample may be carried out first. Based on the results, and potential uncertainties of the sample, X-ray phase contrast imaging could be performed to validate such uncertainties (presence of aggregation states within the SAXS measuring position or different entities) which would not have been detected due to a potential lack of contrast of X-ray absorption image.

Phase contrast imaging data treatment includes a phase retrieval process to extract the phase information from the absorption information. In a preferred embodiment, the data algorithms used are adapted to isolate and extract this information based on a single propagation distance (a single detector measuring position)-in another embodiment of the invention algorithms using several acquisition distances are used.

Phase Contrast Imaging with Phase Modulating Structures

In another embodiment of the invention, the phase contrast imaging could be done by generating a phase image created by a structured object with a repeating structure adapted to produce a wave front modulation of the second X-ray beam and a phase map of the sample by comparing the image generated by the structured object with and without sample interaction when it is placed into the beam. The structured object could be an absorbing structure such as a Hartmann mask, made of a periodic array of absorbing structures, or a phase grating.

In case of a Hartmann mask, the incident beam is modulated in parallel beams by the absorbing structures and the sample phase map is reconstructed by analyzing the deflections created by the sample. One of the advantage of this method is that it limits the number of insertion objects between the sample and the detector as the period of the absorbing structure could be made sufficiently large compared to the wavelength to enable a reconstruction of the phase pattern directly on the detector.

In case where the structured object is a phase grating the incident X-ray beam is phase modulated and an interference fringe pattern is created at specific distances (Talbot distances). This interferometry method generally requires a monochromatic high coherence source and precise positioning of the gratings. In practice use of other gratings (absorbing) could be necessary at the source side to increase the coherence of the source or close to the detector to increase the detector resolution.

In a preferred embodiment of the invention, X-ray phase contrast imaging methods are sought where a limited number of components have to be implemented in the displacement path of the distal detector such as it could be the case with Talbot interferometry method. For operation in the SAXS measuring mode, the system allows the distal detector to be moved along the beam propagation direction so a method is thought with limited complexity of implementation.

In another embodiment of the invention where phase contrast imaging is used based on comparing an image generated by a reference object with and without sample interaction when this one is placed into the beam, the reference object is a random structured object. This method is generally called Speckle Based Phase contrast imaging.

Speckle Based Phase contrast imaging is particularly advantageous in the sense that it does not require a very high spatial coherence of the source (sources larger than 10 microns can be used) and also the random structured object has a moderate cost of fabrication compared to phase gratings used in Talbot X-ray interferometry methods.

Speckle Based Phase Contrast Imaging

In this embodiment of the invention the use of the second X-ray beam delivery system is coupled to the insertion of a random structured object, preferentially in front of the sample holder for speckle based phase contrast imaging as described above in connection with the object insertion unit.

The imaging characterization steps typically include measuring the speckle pattern created by the random structured object on the distal detector placed at a long distance without any sample in place to interact with the propagated second X-ray beam and performing an additional exposure with the sample and random structured object in place to record a sample induced distortion image of the speckle pattern on the distal detector maintained at the same distance. By correlation analysis of speckle pattern with and without sample, a two dimensional phase map of the sample can be retrieved with a resolution depending on the size of speckles, i.e. the resolution of the features of the random structured object, but also the distal detector pixel size and its distance to the sample. The random structured object is a sample made of a random structure with small features and high X-ray intensity contrast and can for example be a sandpaper or cardboard. Alternative characterization sequences of this speckle X-ray imaging could include a scanning of speckle patterns with different lateral positions of the random structured object with movement steps smaller than the speckle size to increase the spatial resolution.

X-ray speckle imaging is a particularly advantageous phase contrast imaging method as it does not require complex gratings structures and reduces the requirements of spatial coherence for the sources to be used.

In speckle-based imaging X-rays impinging on a diffuser, i.e. the random structured object, create a speckle pattern projecting on the detector plane. When a sample, with absorbing, scattering or phase shift properties is placed into the beam, the speckle reference pattern is changed in global intensity (due to absorption contrast A, A=(1−T), T being the Transmission), in position (displacement δ due to refraction angle linked to the sample phase), in amplitude (due to small angle X-ray scattering: intensity scattered by the sample is blurring the speckle pattern, creating a reduction of contrast D after sample transmission correction). Measuring a line profile of X-ray intensity at the detector plane allows to extract the parameters T, δ, D from a 2D image of the speckle modified pattern at the detector. Through reconstruction algorithms, it is thus possible with speckle based imaging to obtain several 2D X-ray images corresponding respectively to absorption contrast, phase contrast, and dark field contrast (due to scattering regions in the sample). In speckle based imaging the phase contrast image is obtained by analyzing the displacement δ along horizontal and vertical direction of the speckle pattern. This could be done with a single exposure analyzing the displacement using a window analysis of several pixels typically. This window of analysis will limit the resolution of the speckle-based phase contrast imaging to its corresponding size. As mentioned, alternative analysis methods would use several exposures with different positions of the random structured object to increase the resolution compared to a single exposure method.

Dark Field Imaging

In a preferred embodiment of the invention the X-ray imaging channel also enables to perform dark field imaging. Advantageously this image could be obtained together with the absorption and phase contrast imaging as with the speckle based imaging. Interferometry methods could also be used as they provide absorption, phase contrast and dark field imaging. In this case motorized insertion devices are provided in the apparatus according to the invention to insert phase gratings and potentially detector gratings. In case of 1D gratings, the gratings insertion device could include a rotation of the grating towards the detector by 90° to perform two sequential experiments and obtain a 2D dark-field image. These insertion devices require a synchronization with the SAXS measuring channel so that the detector travel is made free for change of resolution in SAXS/WAXS measurements.

Alternatively to dark-field imaging with X-ray interferometry methods using 1D grating, a 2D diffractive structure could be used to directly perform a 2D image. In this embodiment the X-ray scattering apparatus according to the invention comprises a mask insertion unit adapted to insert a diffractive mask into the second X-ray beam downstream of the sample holder, said diffractive mask being adapted to produce a modulation pattern of the X-ray beam in order to produce a 2D dark-field image of the sample by comparing the pattern generated by the diffractive mask with and without sample interaction. For example the 2D diffractive mask could comprise concentric absorption rings disposed with a predetermined first period, each of the absorption rings made of an absorption structure comprising additional concentric rings disposed with a predetermined second period smaller than said first period adapted to generate a modulation pattern of the incoming beam. By analyzing the localized reduction of visibility of the x-ray pattern created by the diffractive mask when inserting the sample, a 2D dark-field image is created. The localized reduction of visibility of the X-ray pattern are caused by small angle X-ray scattering from structures inside the sample.

The embodiment of the invention using dark-field imaging is particularly advantageous in that it could combine a large field of view imaging measurement in dark field to identify areas of scattering (isotropic or anisotropic), or areas of increased scattering and quantitatively analyze these areas with SAXS measuring channel. Indeed while the dark field imaging will identify zones of scattering, the angle dependence of such scattering signal will not be accessible or would require additional measurement (at different distances) to identify the scattering signal from different real space correlations.

In the X-ray scattering measuring channel, 2D X-ray scattering intensity image is collected on the detector, and the angular dependence (i.e. wavevector) is retrieved by azimuthal averaging providing additional quantitative information about all the characteristic dimensions in real space contributing to the scattering signal. Moreover dark field imaging intensity is strongly impacted by the scattering intensity from the largest characteristic dimensions (microns in size) which could be measured with USAXS measuring channel or SAXS measuring channel at large sample to detector distances.

Consequently, in a preferred embodiment of the method according to the invention said X-ray imaging analysis comprises a combined absorption, phase contrast and dark-field imaging measurement, and said X-ray scattering analysis comprises a USAXS measurement and/or a SAXS measurement and/or a WAXS measurement.

Preferably the phase contrast imaging step comprises acquiring images of the sample at different sample to detector distances including at least one measurement step with shorter field of view (i.e. larger sample to detector distance) centered on a sample location pre-defined based on absorption and phase imaging measurements with larger field of view for better phase contrast and features definition.

The method according to the invention may further comprise a simultaneous or additional dark-field image acquisition to define a region of interest with different scattering intensities compared to other regions and define a region of interest for further X-ray scattering analysis of the sample using either the USAXS measuring channel or SAXS measuring channel to get quantitative information about characteristic dimensions contributing to the dark-field signal and/or to identify additional characteristic dimensions with a smaller dimension.

In this case the X-ray scattering method according to the invention can comprise acquiring additional dark-field signal images at different measurement settings to probe an additional scattering signal contribution from other characteristic dimensions wherein the characteristic dimension to be probed has been determined from previous USAXS and SAXS measurement.

Preferred embodiments of the X-ray scattering apparatus according to the invention will be described in the following with reference to the attached drawings, in which.

Figure 1A:
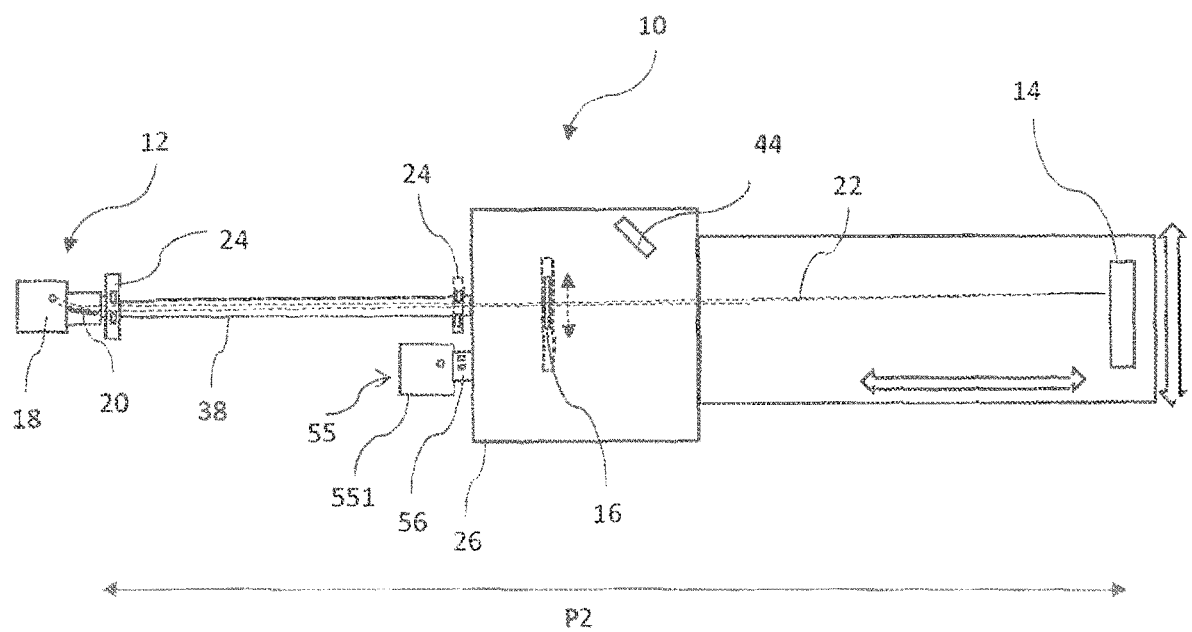
FIG. 1a shows a first embodiment of an X-ray scattering apparatus according to the invention in which the first and the second X-ray beam delivery systems are arranged adjacent to each other in a configuration for SAXS measurements.

FIG. 1a shows a schematic top view of a first embodiment of an X-ray scattering apparatus 10 according to the invention in a configuration for SAXS measurements also referred to as the "SAXS channel". The apparatus 10 is shown from its upstream end at the first X-ray beam delivery system 12 down to its downstream end at a distal X-ray detector 14. The apparatus 10 serves for analyzing a sample mounted on the sample holder 16.

In all top views shown in the figures, the upstream end of the X-ray scattering apparatus 10 is at the left and the downstream end is at the right. The propagation direction Y of the first X-ray beam and the second X-ray beam is therefore from left to right.

Furthermore the propagation direction Y is assumed to be horizontal in the laboratory system. The horizontal direction perpendicular to Y is called an X direction, and a vertical direction perpendicular to X and Y is called a Z direction pointing out of the paper plane in all figures.

The first X-ray beam delivery system 12 comprises a first X-ray source 18 and a first monochromator 20. As indicated by dashed lines in FIG. 1a, the first monochromator 20 is chosen and set such as to collect X-rays generated by the first X-ray source 18 and focus them as a first X-ray beam 22 onto a focal spot on or near the distal X-ray detector 14 when the distal X-ray detector 14 is placed at its largest distance in the Y direction from the sample holder 16. In this context "near" means that the distance between the focal spot of the first X-ray beam 22 and the distal X-ray detector 14 is approximately 20% of the distance P2 (indicated by a double arrow in FIG. 1a) between the focal spot and the first monochromator 20. The focal spot can be before (i.e. upstream) or after (i.e. downstream) the distal X-ray detector 14. Alternatively, it is also possible for the first monochromator 20 to produce an essentially parallel beam.

The first X-ray source 18 is preferably a point focus source, and the first monochromator 20 is preferably a point focus monochromator.

The beam shape can be further defined by means of slit modules 24 that are preferably of the "scatterless" or "scatterfree" type. In FIG. 1a two such slit modules 24 are shown, a first one immediately downstream of the first monochromator 20 and a second one immediately upstream of a vacuum chamber 26. This vacuum chamber 26 accommodates the sample holder 16 that may comprise a motorized translation and/or rotation stage and other typical sample stage devices known in the field of X-ray scattering.

For WAXS experiments the distal X-ray detector 14 can be moved, in particular in a motorized way, along the propagation direction Y towards the vacuum chamber 26. However, in the embodiment shown in FIG. 1a, a proximal X-ray detector 44 is located inside the vacuum chamber 26 and allows to detect WAXS signals scattered or diffracted from the sample.

The X-ray scattering apparatus 10 furthermore comprises a second X-ray beam delivery system 55 comprising a second X-ray source 551 and being configured to generate and direct a divergent second X-ray beam towards the sample holder 16 for X-ray imaging. While this second X-ray beam delivery system 55 is inactive in the SAXS configuration shown in FIG. 1a it is active in the imaging configuration shown in FIG. 1b also referred to as the "imaging channel" and described in the following:

The second X-ray beam delivery system 55 is configured to produce a cone shaped beam 58 propagating towards the distal X-ray detector 14. This cone shape beam 58 is indicated by dashed lines in FIG. 1b. The second X-ray source 551 is preferentially a source with solid anode, e.g. Chromium, Copper, Molybdenum, Silver, or Tungsten, and emits X-ray beams with a broad energy distribution, i.e. comprising characteristic fluorescence lines of the anode (Kα, Kβ, Lα) and bremsstrahlung radiation. In a preferred embodiment of the invention the second X-ray beam delivery system 55 produces a polychromatic beam in the sense that this beam has much lower monochromaticity compared to the first X-ray beam 22 used for SAXS. Still a significant portion of the X-ray beam 58 is made of characteristic fluorescence lines of the anode. The second X-ray beam delivery system 55 furthermore comprises a shutter coupled to a primary slit module 56 to define a cone beam for illumination of a sample area in the range of few mm. The second X-ray beam delivery system 55 might also include a filter. And the slit module 56 might be a combination of slits in order to control the dimensions of the cone shaped beam 58, wherein typically a cone in the range of few degrees will be used. The second X-ray source 551 could be typically a source with a Tungsten or Molybdenum anode excited up to 50 kV, alternatively up to 70 kV, depending on the materials to be analyzed and of small focus size, i.e. 50 microns focus or less, preferably of 10 microns or less.

Figure 1B:
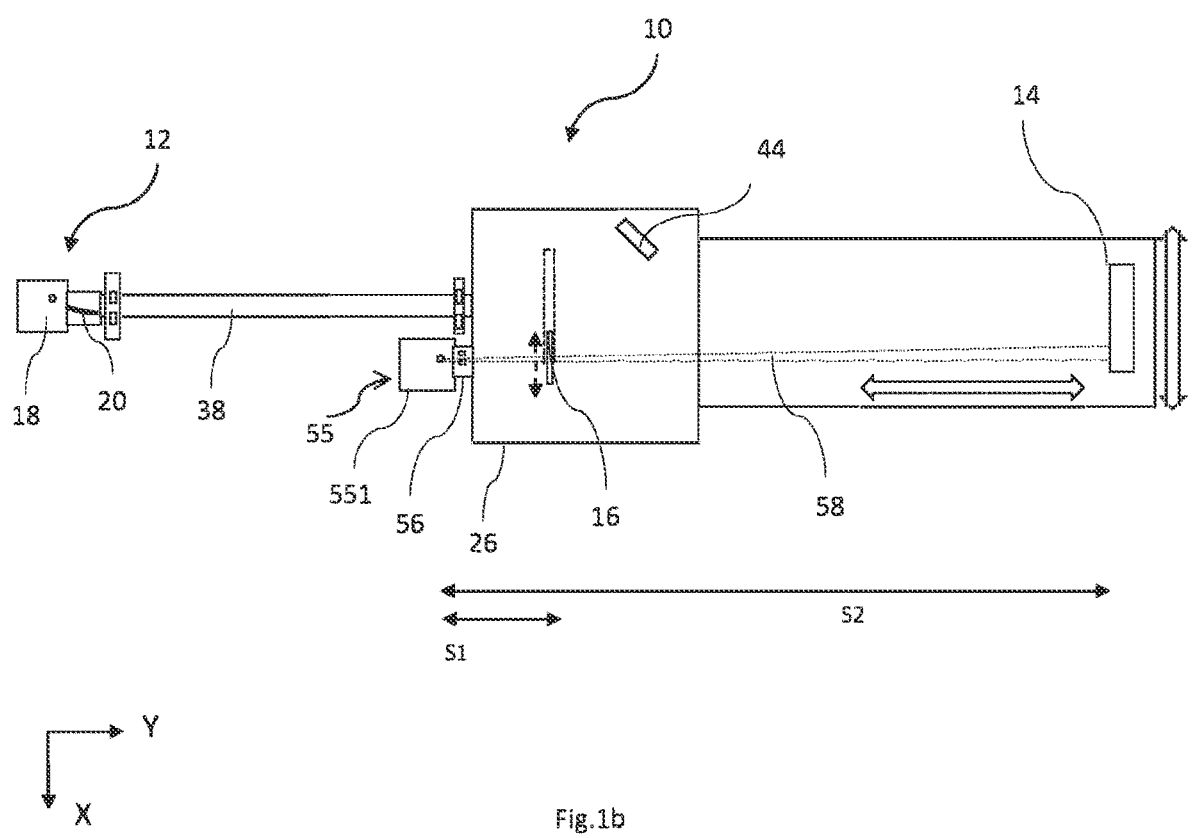
FIG. 1b shows the embodiment of FIG. 1a in a configuration for X-ray imaging measurements.

In the embodiment shown in FIGS. 1a and 1b the second X-ray beam delivery system 55 is fixedly located at a position upstream of the sample holder 16 such as to let the first X-ray beam 22 pass, and emits the second X-ray beam 58 essentially parallel to the first X-ray beam 22. The sample holder 16 is movable, in particular in a motorized way, in a plane perpendicular to the propagation direction Y of the first X-ray beam 22, as is indicated by a double arrow next to the sample holder 16 in FIGS. 1a and 1b. This allows to move the sample from the first X-ray beam 22 in the SAXS configuration shown in FIG. 1a to the second X-ray beam 58 in the imaging configuration shown in FIG. 1b. The distal X-ray detector 14 can be used in both configurations, i.e. for SAXS and for imaging measurements. Depending on the size of the X-ray detector 14 it can either stay fixed in the XZ plane or may be movable in the X direction and/or the Z direction to intercept the beam 58, in addition to its movability along the Y direction. In the embodiment shown in FIGS. 1a and 1b the detector has rather large dimensions in the XZ plane. It is therefore able to receive both the first X-ray beam 22 during SAXS measurements and the second X-ray beam 58 during imaging measurements without any need to be moved in the XZ plane.

In this embodiment of the invention the second X-ray beam delivery system 55 is positioned at the entrance of the vacuum chamber 26 fixed on the wall (or attached to a reference plate) directly attached to a vacuum flange, i.e. without window to isolate the second X-ray source 551, in addition to a beryllium exit window of the source 551 at the same vertical or horizontal position than the main collimation path of the first X-ray beam delivery system 12. Using a compact X-ray source 551 and primary slit modules 56 a distance in the range of 50 mm-100 mm between the first and second X-ray beam propagation axis can be achieved. Alternatively, if the X-ray source 551 is sufficiently compact, the second X-ray beam delivery system 55 could be placed inside the vacuum chamber 26.

In the embodiment shown in FIGS. 1a and 1b the second X-ray beam delivery system 55 has propagation planes parallel to the main propagation plane of the first X-ray beam delivery system 12 with an inclination comprised within ($-10°<0<+10°$). It can be typically configured to measure with the sample at the same position (along the SAXS beam propagation direction Y) that is used for SAXS measurements so that the distal X-ray detector 14 can be used for imaging with equivalently long sample to detector distances for SAXS and X-ray imaging. By doing so the resolution of the X-ray imaging is not or at least less limited by detector pixel resolution and the change of characterization channel is made more simple and faster. Alternatively, if a compromise between source and pixel detector resolution is searched, X-ray imaging could be performed with the sample placed at different positions along the X-ray beam propagation axis Y.

The small inclination of the propagation planes between the first X-ray beam 22 and the second X-ray beam 58 also ensures that a large field of view (i.e. measuring sample area) can be achieved while maintaining a large sample to detector distance. The distal detector 14 used for SAXS is typically a 2D hybrid pixel detector with pixel size in the range of 55 µm to 172 µm and is mainly designed to be adapted for SAXS i.e., it has low noise, a high count rate to measure in absolute intensity and a high efficiency. Typically the size can be in the range of 30 mm by 75 mm (like an Eiger2R 500K) or 75×75 mm2 (Eiger2R 1M) or as large as 150 mm×150 mm (Eiger2R 4M). Independently of the size of the distal X-ray detector 14 in state of the art SAXS apparatus, the detector 14 can be motorized in the detector plane, i.e. along the X and/or the Z direction either to increase the detection surface at a given sample to detector distance or to remove the dead zones within each detector module used for detector assembly. A small inclination of the X-ray imaging beam is required to maintain a large field of view (FOV) of the sample that matches the detector size (FOVdetector=FOVsample*S2/S1). Alternatively several exposures are performed for X-ray imaging characterization wherein the distal X-ray detector 14 is moved in the XZ plane to increase the surface of detection and the detector field of view (FOVdetector).

In this embodiment of the invention wherein the distal X-ray detector 14 is motorized in the XZ plane, the X-ray imaging acquisition may consist in acquiring several data exposures with a change of position of the detector by a range consisting of a subpixel dimension. By the convolution of the pixel response function and the incoming spatial X-ray intensity distribution a composite image with a subpixel dimension could be obtained. For example, by moving the detector by half the pixel dimension in both vertical and horizontal directions it could be possible to generate a composite image with half of the physical pixel dimension.

While the first X-ray beam delivery system 12 typically produces a beam size at the sample typically less than a mm2 the second X-ray beam delivery system 55 can produce a beam size as large as few tenths of millimeters. The inventors have experienced that using a state of the art SAXS system X-ray imaging data could be acquired with a resolution of few microns despite using an X-ray detector 14 with pixel size larger than state of the art X-ray imaging systems.

Figure 2:
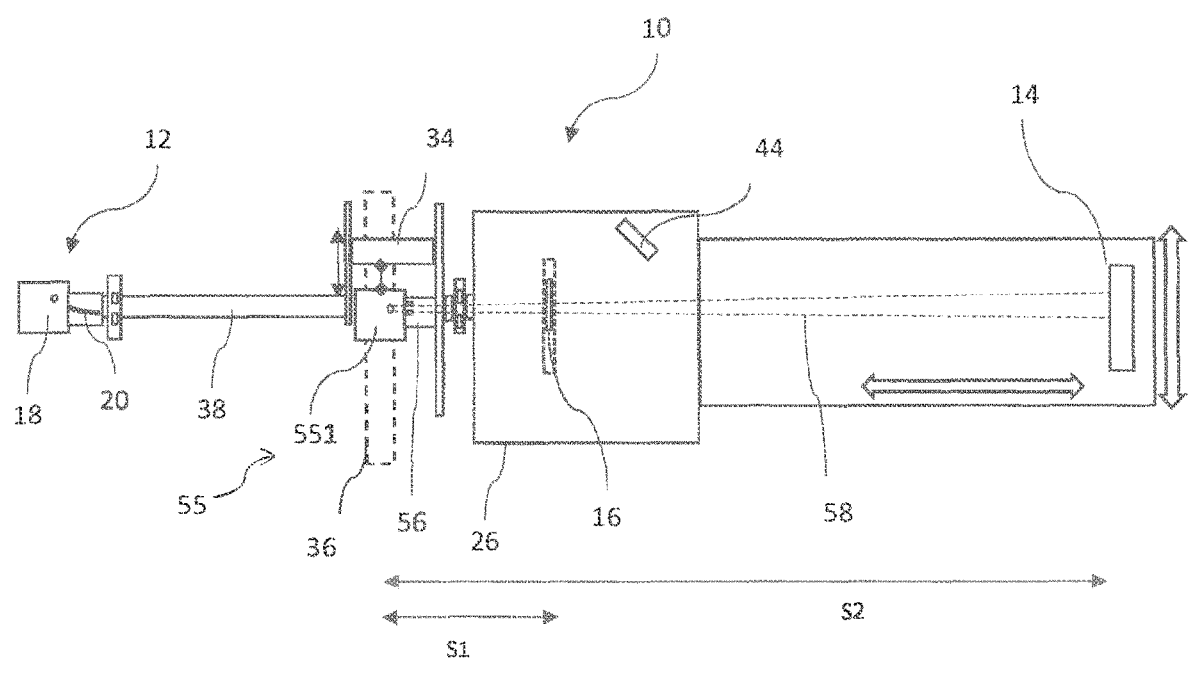
FIG. 2 shows a second embodiment of an X-ray scattering apparatus according to the invention which comprises an insertion module to move the second X-ray beam delivery system into the first X-ray beam.
Figure 2:
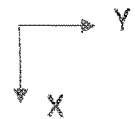

Positioning of the second beam delivery system 55 at the entrance of the vacuum chamber 26 as shown in the first embodiment of FIGS. 1a and 1b allows to achieve high intensities on the sample. However in the case where the source 55 is too big a different configuration can be chosen. This will be explained in connection with the second embodiment shown in FIG. 2:

In the second embodiment shown in FIG. 2 the X-ray scattering apparatus 10 according to the invention furthermore comprises an insertion module 36 configured to move the second X-ray beam delivery system 55 into the first X-ray beam 22 at a position upstream of the sample holder 16. Furthermore a main collimation tube 38 is provided extending along the beam path from a position downstream the first X-ray beam delivery system 12 to a position upstream the sample holder 16, wherein the insertion module 36 comprises a motorized platform 36 configured to alternatively position the second X-ray beam delivery system 55 or a collimation tube extension 34 into the beam path at a position between the main collimation tube 38 and the sample holder 16.

For SAXS measurements the collimation tube extension 34 is then positioned in the beam path allowing the first X-ray beam 22 to serve as the direct beam that impinges onto the sample mounted on the sample holder 16. For imaging measurements, however, the second X-ray beam delivery system 55 is positioned in the beam path by means of the motorized platform 36. The computer control system of the X-ray scattering apparatus 10 can then activate a shutter of the first X-ray beam delivery system 12 to block the first X-ray beam 22 while activating a shutter of the second X-ray beam delivery system 55 so that the second X-ray beam 58 illuminates the sample.

The downstream end of the main collimation tube 38 and the upstream end of the collimation tube extension 34 are provided with respective connection elements for vacuum-tight connection. These connection elements comprise sliding plates with vacuum-tight O-rings. The same holds true for the downstream end of the collimation tube extension 34 allowing for a vacuum-tight connection with the vacuum chamber 26 where the sample holder 16 is placed. This set-up with the connecting parts 362 and 364 ensures that the inside of the collimation tube extension 34 is in the same evacuated environment as the inside of the main collimation tube 38 either when the first X-ray beam delivery system 12 or the second X-ray beam delivery system 55 is active or during the change of configuration, thus ensuring a quick change of configuration of measurement.

In an embodiment of the invention, the connecting parts 362 and 364 are for example composed of sliding plates attached to the collimation tube extension 34 or to the second X-ray beam delivery system 55 surrounded by sliding seals ensuring that vacuum is kept inside the collimation tube extension 34 and inside second beam delivery system 55 at any time including when the change of configuration is done. The sliding seals are designed to ensure vacuum tight connection and low friction when moving along the counter part surfaces of the sliding plates, which should be flat and smooth. The collimation tube extension 34 can be a rigid tube or alternatively a more flexible system combining bellows and more rigid parts to facilitate the change of configuration of measurement when the sliding plates are moved.

Alternatively, the collimation tube extension 34 is provided with a retraction/expansion mechanism. The collimation tube extension 34 can then be retracted and expanded for example by a telescope mechanism. In the retracted condition the collimation tube extension 34 can easily be inserted between the main collimation tube 38 and the sample holder 16 by reducing the friction and contact with the mechanical elements in contact during movement of the motorized platform 36 holding the collimation tube extension 34. As soon as the collimation tube extension 34 has reached its final position in the beam path, it can then be expanded until getting in contact with the main collimation tube 38 and/or the vacuum chamber 26 in which the sample holder 16 is located or any other optical component arranged upstream the vacuum chamber 26.

Figure 3:
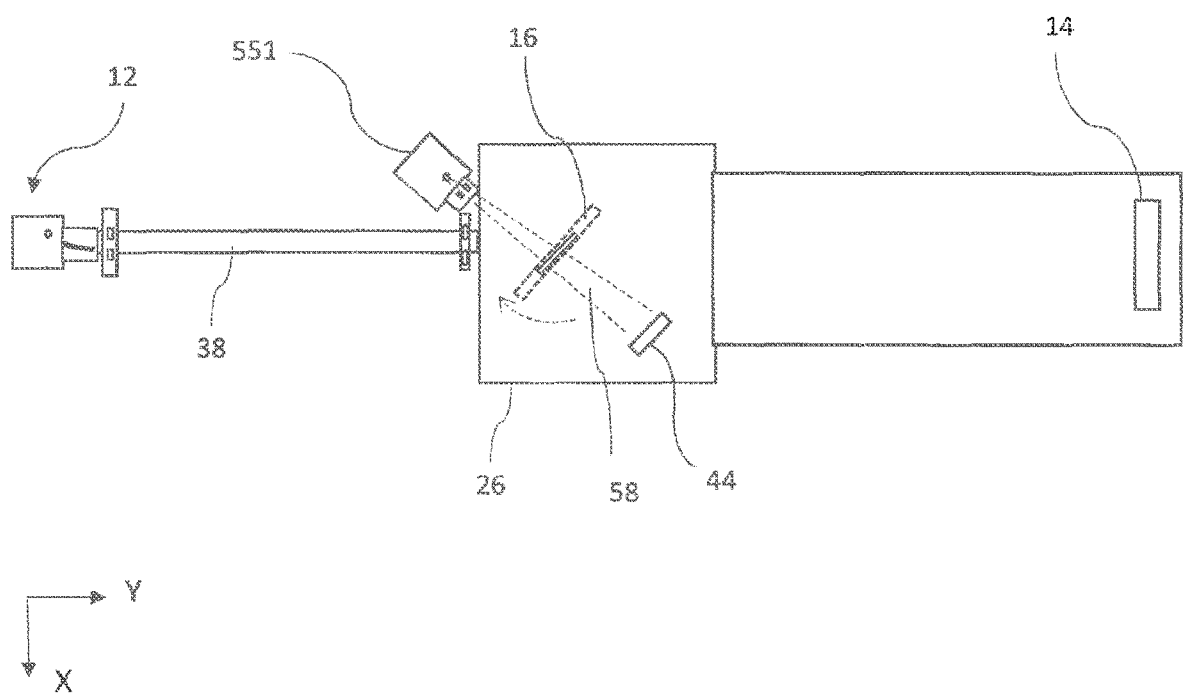
FIG. 3 shows a third embodiment of an X-ray scattering apparatus according to the invention in which the second X-ray beam has a propagation direction that intersects the propagation direction of the first X-ray beam at the sample position.

Whereas the propagation directions of the first X-ray beam 22 and the second X-ray beam 58 are essentially parallel (less than 10°) in the first and second embodiments discussed above allowing to use the distal X-ray detector 14 both for SAXS and for imaging measurements, FIG. 3 shows a third embodiment of an X-ray scattering apparatus 10 according to the invention in which the propagation direction of the second X-ray beam 58 has an angle with respect to the propagation direction Y of the first X-ray beam 22 of greater than 10°. The propagation direction of the two X-ray beams 22, 58 intersects at the sample position.

In this third embodiment the second X-ray beam delivery system 55 is located at a position upstream of the sample holder 16 such as to let the first X-ray beam 22 pass and furthermore comprises a proximal X-ray detector 44 arranged downstream of the sample holder 16 such as to let the first X-ray beam 22 pass and detect X rays from the second X-ray beam delivery system 55 transmitted through the sample. As shown in FIG. 3 the proximal X-ray detector 44 is located inside the vacuum chamber 26.

As indicated by a dashed arrow in FIG. 3, the sample holder 16 and/or the proximal X-ray detector 44 are rotatable, in particular in a motorized way, about at least one axis of rotation passing through the sample holder 16 and being perpendicular to the propagation direction of the second X-ray beam 58. In particular the proximal X-ray detector 44 is preferably movable in a motorized way along two circles of rotation centered on the sample in order to position on a portion of the Ewald sphere to collect scattered signals in a horizontal or vertical direction for X-ray scattering experiments.

Figure 4:
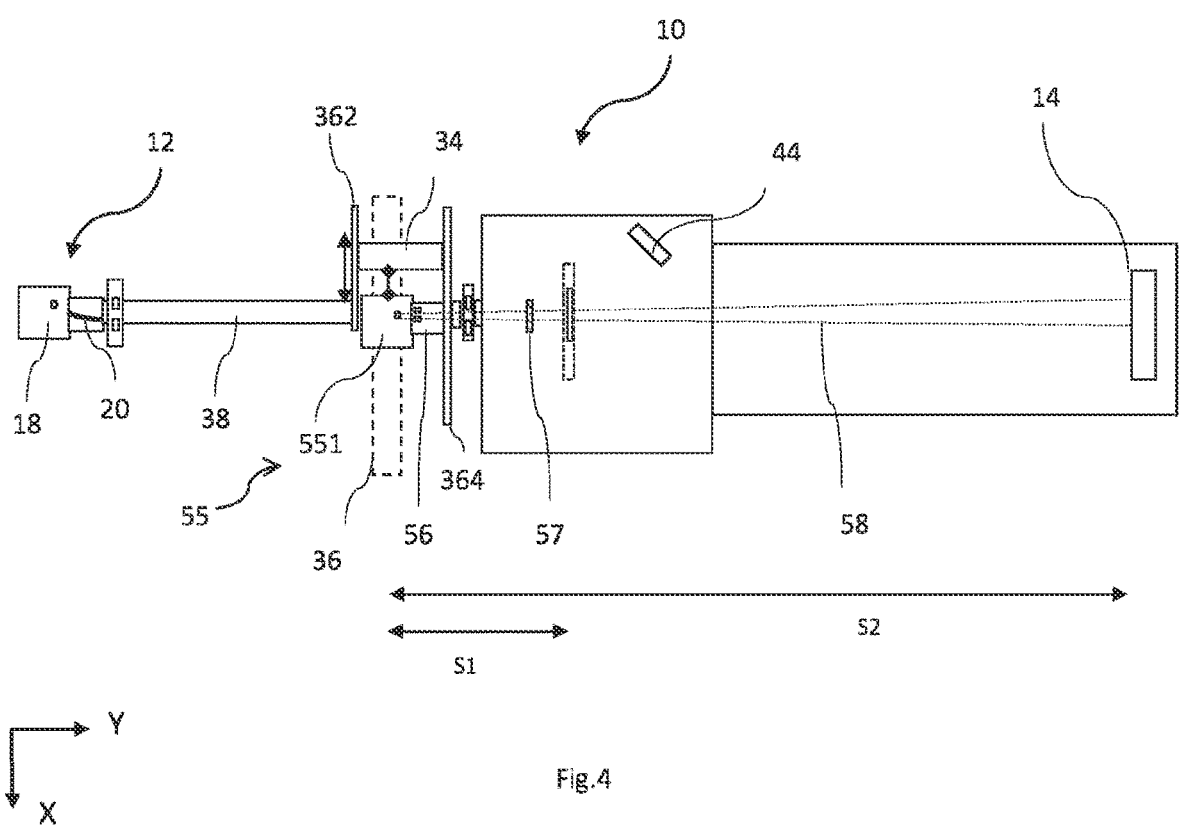
FIG. 4 shows a modification of the second embodiment according to FIG. 2 in which an additional object insertion unit is provided in the vacuum chamber housing the sample.

FIG. 4 shows a modification of the second embodiment according to FIG. 2 in which an additional object insertion unit 57 is provided in the vacuum chamber 26 housing the sample. The object insertion unit 57 is adapted to mount a random structured object and insert it into the second X-ray beam 58. In the third embodiment shown in FIG. 4 the object insertion unit 57 is arranged upstream of the sample holder 16. Alternatively it could also be arranged downstream of the sample holder 16.

Positioning a random structured object in the second X-ray beam 58 allows to measure absorption, phase contrast and also dark field imaging, e.g. speckle based phase contrast imaging, using the distal detector 14 as described in detail above.

Of course, an object insertion unit 57 can also be provided in the first and third embodiments described above.

This X-ray imaging channel as for all the modalities described could also include capability to perform tomography experiments by spinning the sample during the X-ray exposures. In order to do so the sample holder 16 could include for example a vertical rotation stage around Z axis for spinning the sample during the X-ray exposure with the second X-ray beam 58. In case of speckle based phase contrast imaging, the tomography experiment includes a single exposure with the random structure object exposed to the second X-ray beam 58 and without the sample exposed, and a tomography sequence with both the sample and the random structure object exposed while spinning the sample.

Figure 5:
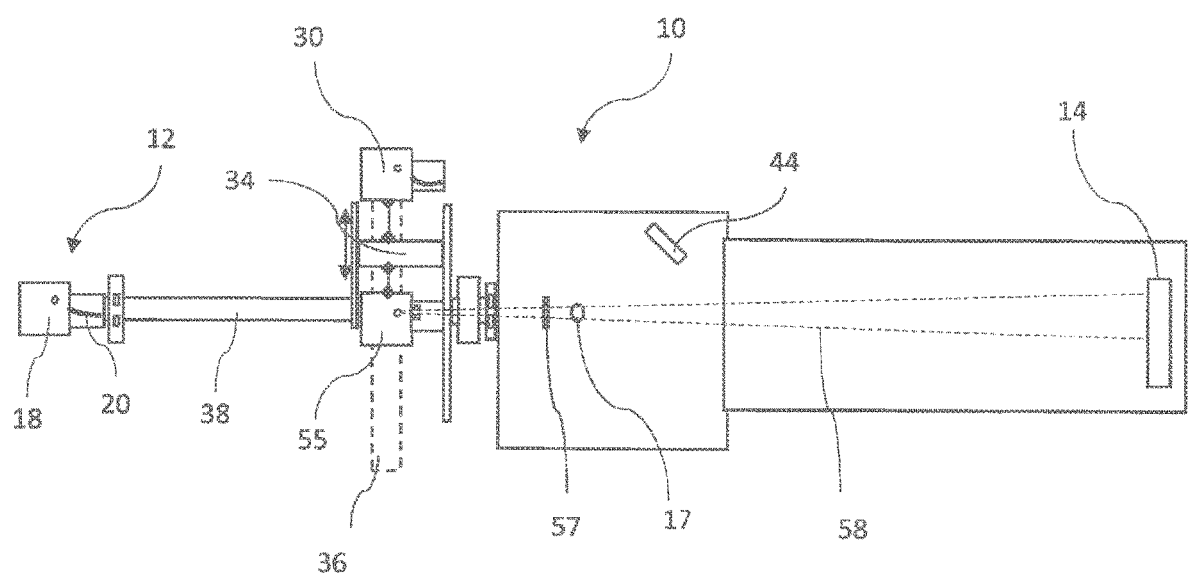
FIG. 5 shows a modification of the second embodiment according to FIG. 4 equipped with a further X-ray beam delivery system for WAXS measurements.

FIG. 5 shows a modification of the second embodiment according to FIG. 4 equipped with a further X-ray beam delivery system comprising a further X-ray source 30 configured to focus a further X-ray beam onto a focal spot on or near the sample holder 16 for WAXS measurements. This further X-ray beam delivery system is also mounted on the motorized platform 36 holding the collimation tube extension 34 and the second X-ray beam delivery system 55. FIG. 5 shows this modification of the X-ray scattering apparatus 10 according to the invention in its configuration for imaging measurements with the cone shaped second X-ray beam 58 illuminating the sample 17 through a random structured object which can of course also be omitted. Starting from the configuration shown in FIG. 5 a movement of the motorized platform 36 along the X direction will first put the X-ray scattering apparatus 10 in its configuration for SAXS measurements in which the first X-ray beam propagating through the main collimation tube 38 and the collimation tube extension 34 will hit the sample. A further movement of the motorized platform 36 along the X direction will then put the X-ray scattering apparatus 10 in its configuration for WAXS measurements using the X-ray beam generated by the further X-ray source 30.

This setup allows to use the first X-ray beam 22 generated by the first X-ray beam delivery system 12 for SAXS measurements, whereas the further X-ray beam obtained by means of the further X-ray source 30 is used for WAXS measurements including high resolution WAXS measurements or for small sample exposed area scattering applications. Details of this further optimization of an X-ray scattering apparatus 10 for WAXS measurements are described in the applicant's European Patent Application 19290126.2 the contents of which are herewith incorporated by reference.

In a further development of the invention, the second beam delivery system 55 could include a large convergence angle monochromatic optic (i.e. 1° for multilayer or several degrees in case of doubly curved crystal) coupled to a pinhole placed close to the sample position in order to create a small monochromatic secondary source focus. This provides the advantage of modifying the flux/resolution ratio with different pinhole sizes.

The X-ray generators used in the first X-ray source 18, the second X-ray source 55 and the further X-ray source 30 can comprise sealed tube X-ray sources, preferably microfocus sealed tube sources, or rotating anodes, preferably with a point focus, or liquid jet anodes.

A "focal spot" as used throughout the description and claims need not necessarily be point-like. It can also be line-shaped or generally have a 2D or 3D shape, depending on the respective sample and the intended X-ray scattering analysis.

The invention claimed is:
1. An X-ray scattering apparatus (10), comprising:
a sample holder (16) for aligning and/or orienting a sample (17) to be analyzed by X-ray scattering;
a first X-ray beam delivery system (12) comprising a first X-ray source (18) and a first monochromator (20) and being arranged upstream of the sample holder (16) for generating and directing a first X-ray beam (22) along a beam path in a propagation direction (Y) towards the sample holder (16);

a distal X-ray detector (14) arranged downstream of the sample holder (16) and being movable, in particular in a motorized way, along the propagation direction (Y) such as to detect the first X-ray beam (22) and X-rays scattered at different scattering angles from the sample (17);

wherein the first X-ray beam delivery system (12) is configured to focus the first X--ray beam (22) onto a focal spot on or near the distal X-ray detector (14) when placed at its largest distance from the sample holder (16) or to produce a parallel beam, wherein the X-ray scattering apparatus (10) furthermore comprises a second X-ray beam delivery system (55) comprising a second X-ray source (551) and being configured to generate and direct a divergent second X-ray beam (58) towards the sample holder (16) for X-ray imaging; and wherein the second X-ray beam (58) has a propagation direction having an angle with respect to the propagation direction (Y) of the first X-ray beam (22) of less than or equal to 10°.

2. The X-ray scattering apparatus (10) according to claim 1, characterized in that the second X-ray beam (58) is parallel to the first X-ray beam (22).

3. The X-ray scattering apparatus (10) according to claim 1, characterized in that the second X-ray beam delivery system (55) is fixedly located at a position upstream of the sample holder (16) such as to let the first X-ray beam (22) pass.

4. The X-ray scattering apparatus (10) according to claim 1, characterized in that the sample holder (16) is movable, in particular in a motorized way, in a plane perpendicular to the propagation direction (Y) of the first X-ray beam (22).

5. The X-ray scattering apparatus (10) according to claim 1, characterized in that it furthermore comprises an insertion module (36) configured to move the second X-ray beam delivery system (55) into the first X-ray beam (22) at a position upstream of the sample holder (16).

6. The X-ray scattering apparatus (10) according to claim 5, characterized in that it furthermore comprises a main collimation tube (38) extending along the beam path from a position downstream the first X-ray beam delivery system (12) to a position upstream the sample holder (16), wherein the insertion module (36) comprises a motorized platform (36) configured to alternatively position the second X-ray beam delivery system (55) or a collimation tube extension (34) into the beam path at a position between the main collimation tube (38) and the sample holder (16).

7. The X-ray scattering apparatus (10) according to claim 6, characterized in that the downstream end of the main collimation tube (38) and the upstream end of the collimation tube extension (34) are provided with respective connection elements for vacuum-tight connection.

8. An X-ray scattering apparatus (10) comprising:

a sample holder (16) for aligning and/or orienting a sample (17) to be analyzed by X-ray scattering;

a first X-ray beam delivery system (12) comprising a first X-ray source (18) and a first monochromator (20) and being arranged upstream of the sample holder (16) for generating and directing a first X-ray beam (22.) along a beam path in a propagation direction (Y) towards the sample holder (16);

a distal X-ray detector (14) arranged downstream of the sample holder (16) and being movable, in particular in a motorized way, along the propagation direction (Y) such as to detect the first X-ray beam (22) and X-rays scattered at different scattering angles from the sample (17);

wherein the first X-ray beam delivery system (12) is configured to focus the first X-ray beam (22) onto a focal spot on or near the distal X-ray detector (14) when placed at its largest distance from the sample holder (16) or to produce a parallel beam, wherein the X-ray scattering apparatus (10) furthermore comprises a second X-rav beam delivery system (55) comprising a second X- ray source (551) and being configured to generate and direct a divergent second X-ray beam (58) towards the sample holder (16) for X-ray imaging; and wherein the second X-ray beam (58) has a propagation direction having an angle with respect to the propagation direction (Y) of the first X-ray beam (22) of greater than 10°.

9. The X-ray scattering apparatus (10) according to claim 8, characterized in that the second X-ray beam delivery system (55) is located at a position upstream of the sample holder (16) such as to let the first X-ray beam (22) pass, furthermore comprising a proximal X-ray detector (44) arranged downstream of the sample holder (16) such as to let the first X-ray beam (22) pass and detect X rays from the second X-ray beam delivery system (55) transmitted through the sample (17).

10. The X-ray scattering apparatus (10) according to claim 9, characterized in that the sample holder (16) and/or the proximal X-ray detector (44) are rotatable, in particular in a motorized way, about at least one axis of rotation passing through the sample holder (16) and being perpendicular to the propagation direction of the second X-ray beam (58).

11. The X-ray scattering apparatus (10) according to claim 1, wherein a random structured object is inserted into the second X-ray beam upstream or downstream of the sample holder (16) so that X-ray phase contrast and/or X-ray dark field image is produced on the distal X-ray detector (14).

12. The X-ray scattering apparatus (10) according to claim 1, wherein a structured object is inserted into the second X-ray beam with a repeating structure adapted to produce a wavefront modulation of the second X-ray beam in order to obtain a phase map of the sample by comparing the image generated by the structured object with and without sample interaction when it is placed into the beam.

13. The X-ray scattering apparatus (10) according to claim 1, wherein a diffractive mask is inserted into the second X-ray beam upstream or downstream of the sample holder (16), said diffractive mask being adapted to produce a modulation pattern of the second X-ray beam in order to produce a 2D dark-field image of the sample by comparing the pattern generated by the diffractive mask with and without sample interaction when it is placed into the beam.

14. The X-ray scattering apparatus (10) according to claim 1, characterized in that it furthermore comprises a computer control system configured to control the X-ray scattering apparatus (10) such as to carry out measurements using the first X-ray beam delivery system (12) and the second X-ray beam delivery system (55) one after the other or simultaneously.

15. The X-ray scattering method using an X-ray scattering apparatus (10) according to claim 1 and comprising the following steps:

performing an X-ray imaging analysis of a sample mounted on the sample holder (16) using said second X-ray beam (58);

defining a region of interest in or on the sample based on the results of said X- ray imaging analysis; and performing an X-ray scattering analysis of said region of interest using said first X-ray beam (22).

16. The X-ray scattering method according to claim 15, wherein said X-ray imaging analysis comprises a combined absorption, phase contrast and dark-field imaging measurement, and wherein said X-ray scattering analysis comprises a USAXS measurement and/or a SAXS measurement and/or a WAXS measurement.

17. The X-ray scattering apparatus (10) according to claim 8, wherein a random structured object is inserted into the second X-ray beam upstream or downstream of the sample holder (16) so that X-ray phase contrast and/or X-ray dark field image is produced on the distal X-ray detector (14).

18. The X-ray scattering apparatus (10) according to claim 8, wherein a structured object is inserted into the second X-ray beam with a repeating structure adapted to produce a wavefront modulation of the second X-ray beam in order to obtain a phase map of the sample by comparing the image generated by the structured object with and without sample interaction when it is placed into the beam.

19. The X-ray scattering apparatus (10) according to claim 8, wherein a diffractive mask is inserted into the second X-ray bea.m upstream or downstream of the sample holder (16), said diffractive mask being adapted to produce a modulation pattern of the second X-ray beam in order to produce a 2D dark-field image of the sample by comparing the pattern generated by the diffractive mask with and without sample interaction when it is placed into the beam.

20. The X-ray scattering apparatus (10) according to claim 8, further comprising a computer control system configured to control the X-ray scattering apparatus (10) such as to carry out measurements using the first X-ray beam delivery system (12) and the second X-ray beam delivery system (55) one after the other or simultaneously.

21. The X-ray scattering method using an X-ray scattering apparatu claim 8 and comprising the following steps:

performing an X-ray imaging analysis of a sample mounted on the sample holder (16) using said second X-ray beam (58);

defining a region of interest in or on the sample based on the results of said X-ray imaging analysis; and performing an X-ray scattering analysis of said region of interest using said first X-ray beam (22).

22. The X-ray scattering method according to claim 21, wherein said X-ray imaging analysis comprises a combined absorption, phase contrast and dark-field imaging measurement, and wherein said X-ray scattering analysis comprises a USAXS measurement and/or a SAXS measurement and/or a WAXS measurement.

\* \* \* \* \*